United States Patent [19]
Abretske

[11] Patent Number: 5,358,157
[45] Date of Patent: Oct. 25, 1994

[54] PROTECTIVE FRAME STRUCTURE AT REAR OF VEHICLE

[75] Inventor: Edward V. Abretske, West Covina, Calif.

[73] Assignee: Canyon City 4×4, Azusa, Calif.

[21] Appl. No.: 14,750

[22] Filed: Feb. 8, 1993

[51] Int. Cl.5 .................................................. B60R 9/00
[52] U.S. Cl. ........................ 224/42.04; 224/42.03 A; 224/42.06; 224/42.13; 224/42.21; 224/42.24; 224/42.45 R
[58] Field of Search ...................... 224/42.04, 42.03 R, 224/43.06, 43.08, 42.21, 42.44, 42.45 R, 42.03 A, 42.13, 42.12, 42.24

[56] References Cited

U.S. PATENT DOCUMENTS

| | | | |
|---|---|---|---|
| 1,514,557 | 11/1924 | Miner | 224/42.44 |
| 1,648,094 | 11/1927 | Williams | 224/42.44 |
| 2,492,914 | 12/1949 | Barden . | |
| 2,698,118 | 12/1954 | Dickason . | |
| 2,802,612 | 8/1957 | Barcafer | 224/42.08 |
| 3,202,332 | 8/1965 | Walker | 224/42.08 |
| 3,371,832 | 3/1968 | Sekino et al. . | |
| 3,614,136 | 10/1971 | Dent . | |
| 3,658,201 | 4/1972 | Williams et al. | 224/42.44 |
| 4,282,994 | 8/1981 | Hilliard . | |
| 4,570,986 | 2/1986 | Sams . | |
| 4,676,415 | 6/1987 | Kennedy . | |
| 4,756,457 | 7/1988 | Polk . | |
| 4,771,926 | 9/1988 | Anderson et al. . | |
| 4,869,409 | 9/1989 | Wright . | |
| 4,915,437 | 4/1990 | Cherry . | |
| 4,971,237 | 11/1990 | Davis | 224/42.21 |
| 4,993,610 | 2/1991 | Abretske et al. . | |
| 5,029,740 | 7/1991 | Cox | 224/42.44 |

FOREIGN PATENT DOCUMENTS

| | | | |
|---|---|---|---|
| 698960 | 11/1940 | Fed. Rep. of Germany | 224/42.44 |
| 557139 | 8/1923 | France | 224/42.08 |
| 354259 | 8/1931 | United Kingdom | 224/42.44 |

*Primary Examiner*—Linda J. Sholl
*Attorney, Agent, or Firm*—William W. Haefliger

[57] ABSTRACT

Heavy duty protective apparatus mounted at the rear of a vehicle having a vehicle frame, comprising in combination a protective frame unit extending laterally of the vehicle rear, and forming protected space between the frame unit and vehicle rear to receive equipment; support structure including hinge means attached to the vehicle frame and supporting the frame unit for swinging movement rearwardly away from and independently of the vehicle rear; the support structure including struts extending laterally relative to the vehicle frame and at levels such that the frame unit extends laterally and also swings free of interference with the vehicle rear bumper; and utility means carried by the frame unit to move therewith, the utility means being removable from the frame unit.

17 Claims, 3 Drawing Sheets

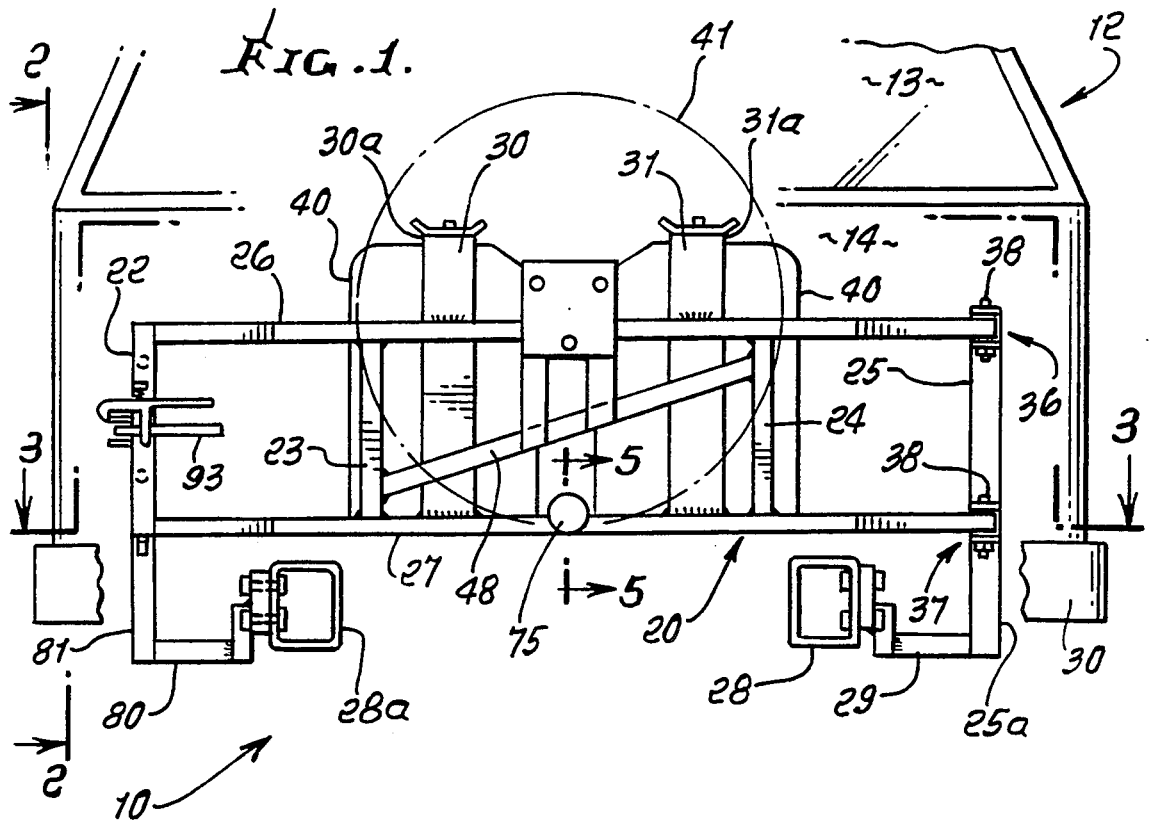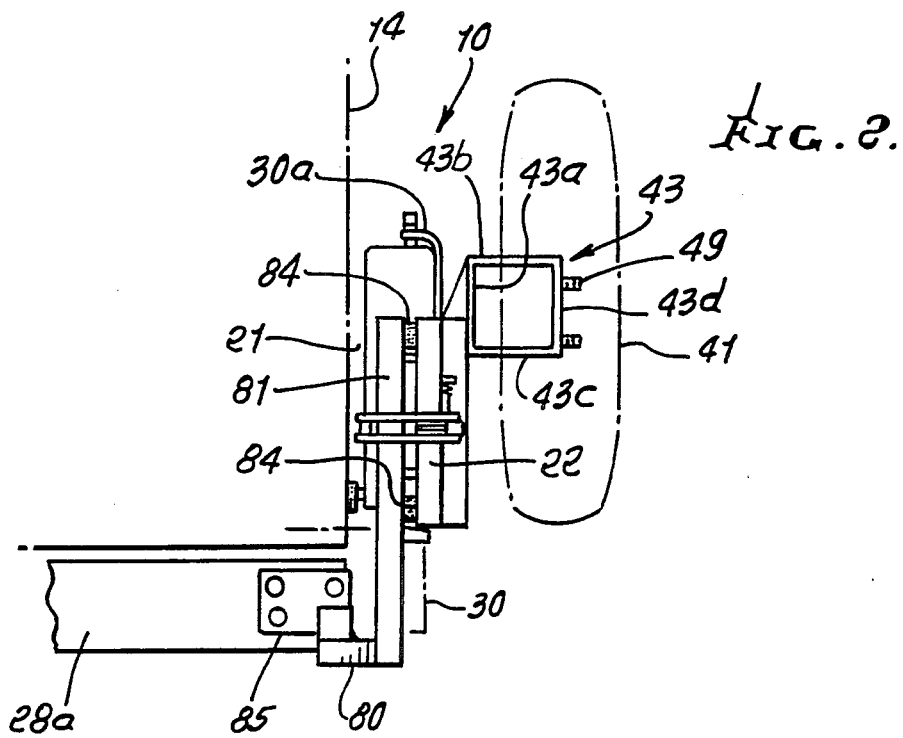

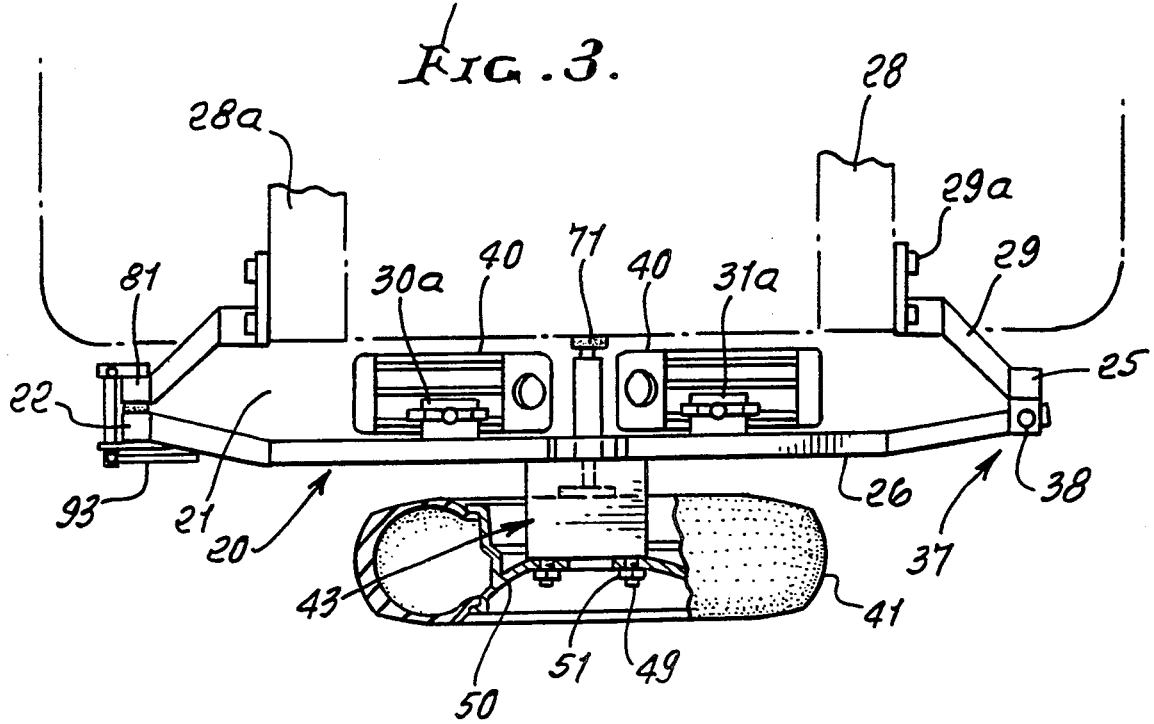
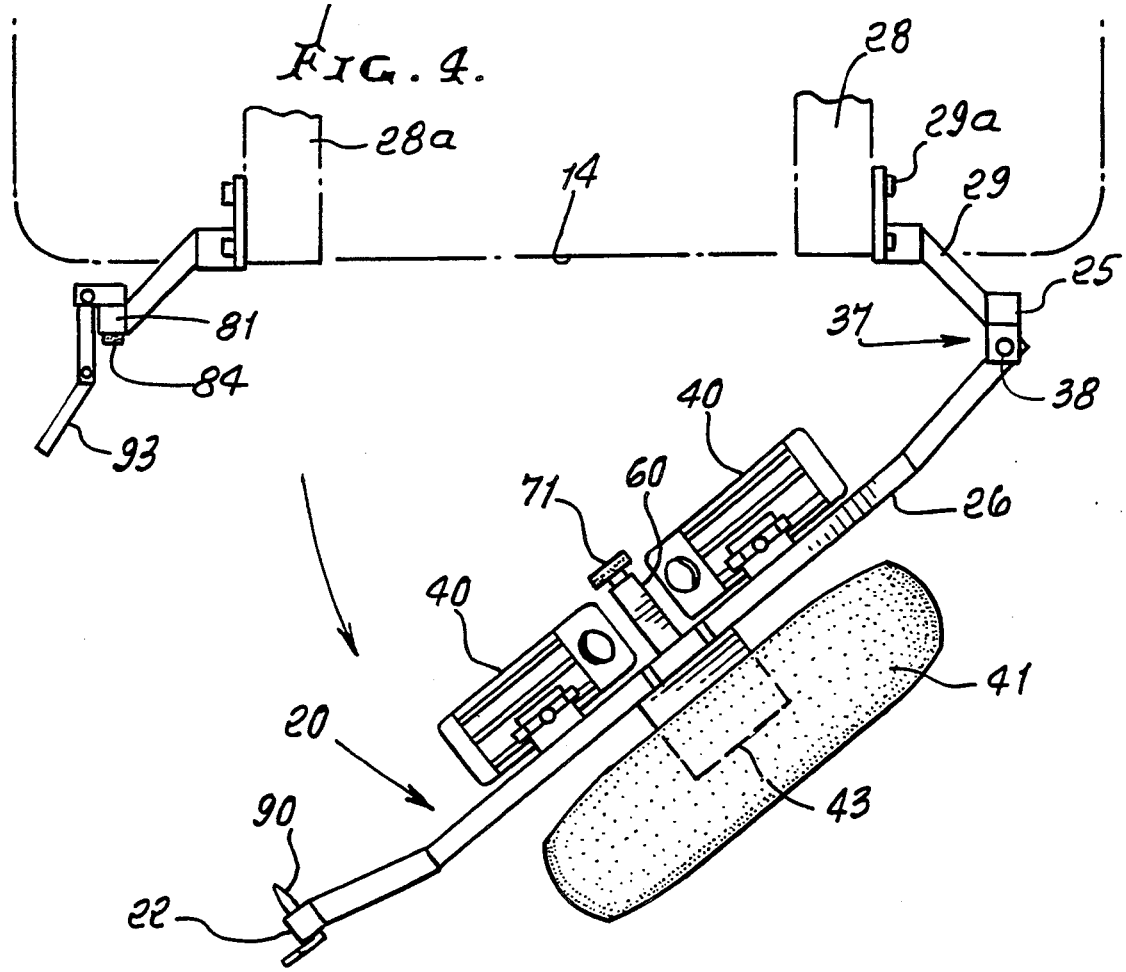

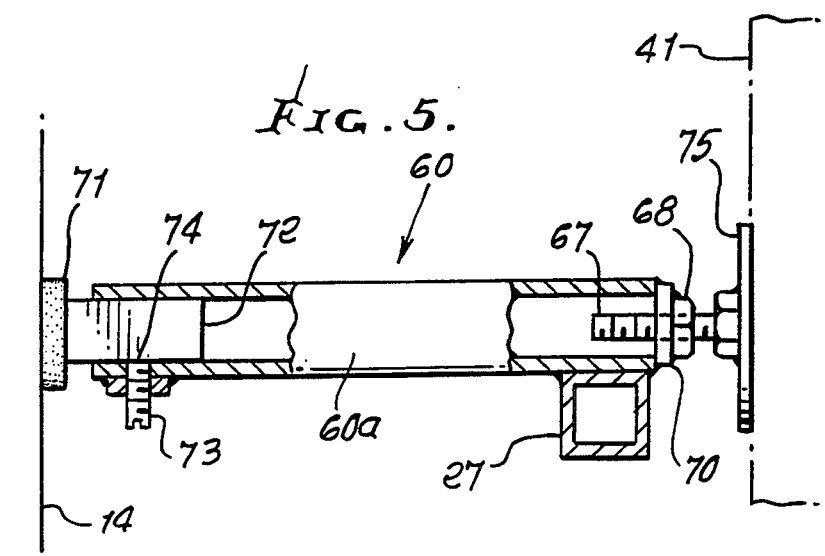
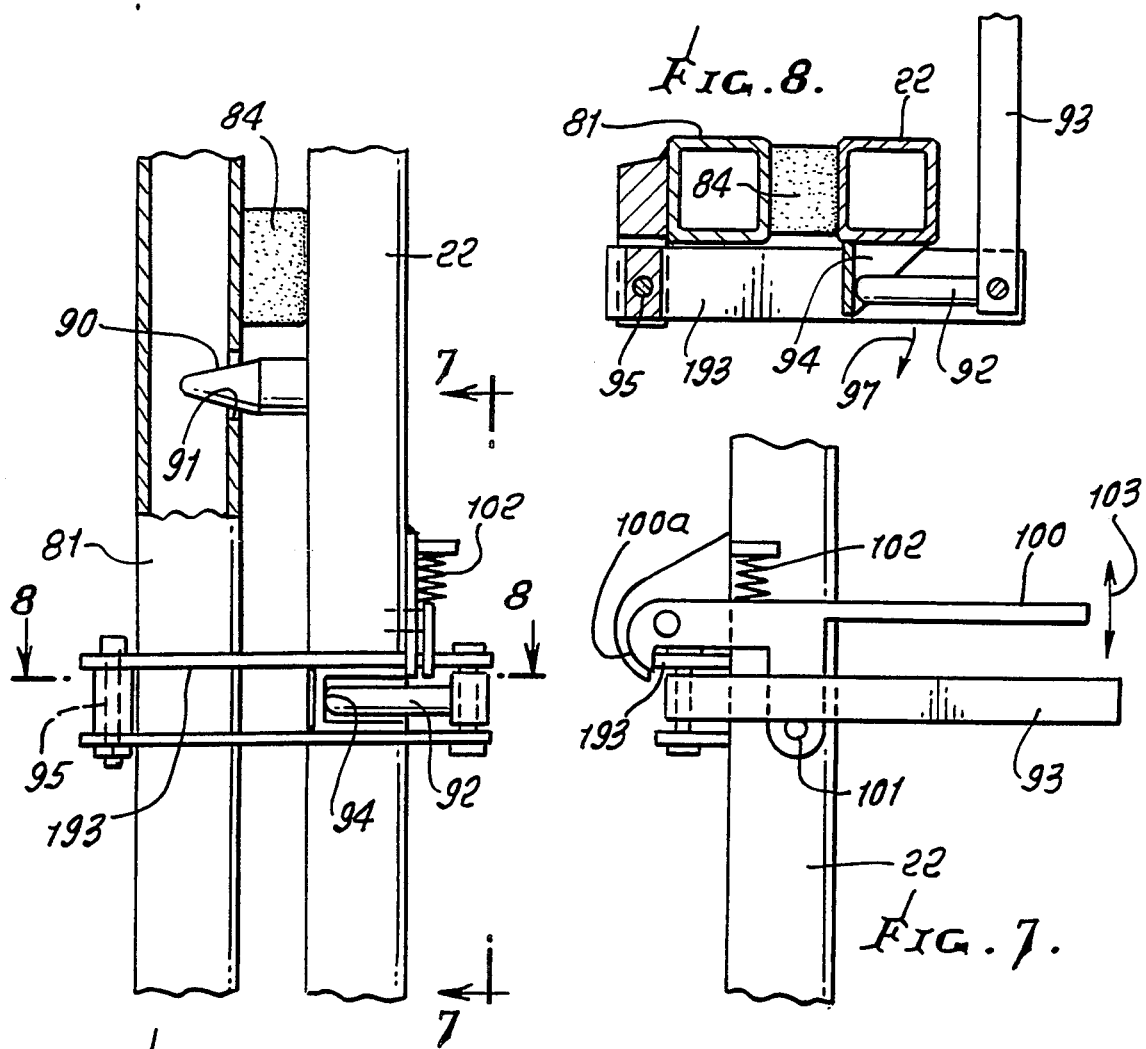

PROTECTIVE FRAME STRUCTURE AT REAR OF VEHICLE

BACKGROUND OF THE INVENTION

This invention relates generally to protective equipments at the rear of vehicles, and more particularly concerns heavy duty protective apparatus supported to extend protectively proximate a vehicle rear, without requiring use of a hinged rear vehicle door at the vehicle rear, the apparatus also having tire and tank supporting and storage capability.

There is well known need to protect the rear of a vehicle, particularly above bumper level. There is also need to provide tire and auxiliary tank storage capability at the rear of a vehicle. U.S. Pat. No. 4,993,610 discloses related apparatus, hinged in conjunction with vehicle rear door hinging. There is also need to provide improved protection and storage capability without hinging in conjunction with a vehicle rear door. No prior apparatus is believed known, incorporating the unusually effective construction, mode of operation, and elements now provided by the present invention.

SUMMARY OF THE INVENTION

It is a major object of the invention to provide simple, effective, improved, and easy to use apparatus meeting the above needs, and also providing additional unusual advantages. Basically, the heavy duty protective apparatus of the invention is mounted at the rear of a vehicle having a vehicle frame, and comprises:

a) a protective frame unit extending laterally of the vehicle rear, and forming protected space between the frame unit and vehicle rear, to receive equipment, b) support structure including hinge means attached to the vehicle frame and supporting the frame unit for swinging movement rearwardly away from and independently of the vehicle rear, c) and utility means carried by the frame unit to move therewith, the utility means being removable from the frame unit.

As will appear, the utility means typically comprises liquid container means such as one or more tanks fitting in and supported in the protected space and by the frame, and/or a vehicle tire or tires carried by the frame rearwardly of the protected space, and to the rear of the container means, to further protect the latter in the event of rear impact.

It is a further object to provide an improved frame unit that includes upright members spaced apart laterally widthwise of the vehicle rear, and vertically spaced generally laterally extending members each connected to the upright members. As will be seen, the frame unit may also include support box means attached to the frame unit, the support box means rearwardly supporting the tire.

Yet another object is to provide a frame unit having end portions which are spaced apart laterally widthwise of the vehicle rear, the support structures including a first support part rigidly connected with the vehicle frame at a first location a second support part rigidly connected with the vehicle frame at a second location, the first and second locations spaced apart laterally widthwise of the vehicle rear, and the hinge means carried by one of the frame unit end portions and the first support part, and including latch means associated with the other of the frame unit end portions and the second support part.

In this regard, the latch means typically includes interfitting latch elements, one element carried by the other of the frame unit end portions, and the other element rigidly carried by the second support part. Easily releasable structure for the latch means, and a cooperating handle to swing the released frame unit, are also provided, whereby gate-opening functioning is provided.

A further object is to provide means extending in force transmitting relation between the frame unit and vehicle rear, above the vehicle frame, to exert force for resisting vibration of the frame unit relative to the vehicle rear.

These and other objects and advantages of the invention, as well as the details of an illustrative embodiment, will be more fully understood from the following specification and drawings, in which:

DRAWING DESCRIPTION

FIG. 1 is a rear elevation showing the protective apparatus in relation to the rear of a vehicle;

FIG. 2 is an end elevation taken on lines 2—2 of FIG. 1;

FIG. 3 is a plan view section taken on lines 3—3 of FIG. 1;

FIG. 4 is a view like FIG. 3 but showing the protective apparatus swung away from the vehicle rear;

FIG. 5 is an enlarged section taken on lines 5—5 of FIG. 1;

FIG. 6 is a fragmentary plan view showing latching structure;

FIG. 7 is a fragmentary section in plan view taken on lines 7—7 of FIG. 6; and

FIG. 8 is a fragmentary section taken in elevation on lines 8—8 of FIG. 6.

DETAILED DESCRIPTION

In FIGS. 1 and 2, heavy duty, improved protective apparatus is shown at 10, mounted at the rear of vehicle 12. The latter has an upper rear window 13 and a lower upright body panel 14, which may or may not be openable.

A heavy duty, upright, protective frame unit 20 extends laterally, i.e. widthwise of the vehicle rear, and is spaced from the vehicle rear to form a protected space 21 between 20 and 14. The frame unit is mounted to the vehicle frame that extends beneath the vehicle body, for rearward swinging movement (see FIG. 4) away from the vehicle rear, to provide access to the latter. Support structure (to be described) including hinge means, is attached or connected to the vehicle frame and supports the frame unit 20 for its swinging movement, as for example between the positions seen in FIGS. 3 and 4.

As shown, the frame unit advantageously includes upright steel members 22-24 which are laterally spaced apart, and vertically spaced generally laterally and horizontally extending steel members 26 and 27 to which members 22-24 are attached as by welding. An additional upright member 25 is rigidly attached to the vehicle frame part 28, as via a steel strut 29 extending between 28 and the lower end 25a of member 25. See FIGS. 1 and 3. Strut 29 extends below the vehicle rear bumper 30, and to member lower end 25a at a location below and to the rear of the right end portion of the bumper. See FIGS. 3 and 4, showing strut 29 bolted at 29a to vehicle frame part 28, for ease of installation to an existing vehicle.

Horizontal frame unit members 26 and 27 are welded to, and support, two upright carrier members 30 and 31, for supporting two metallic containers, such as "Jeri" cans 40, in protected space 21, as shown. Note the support ends 30a and 31a extending above the cans, for supporting them. Clamp bolts (not labeled) may be carried by such turned ends, to clamp the tops and/or bottom of the cans. The latter are swingable with the frame unit away from the vehicle rear, as shown in FIGS. 3 and 4. Hinge connections are provided at 36 and 37 between the right ends of horizontal members 26 and 27, and upright member 25, to accommodate such swinging. See also vertical pivot pins 38 at such hinges.

A spare vehicle tire 41 is also carried by the frame unit 20, but at its rearward side, rearwardly of the containers 40, to provide additional protection for the cans, in case of impact from the rear. A steel support box 43 (see FIG. 2) is attached to the frame unit to rearwardly support the tire. The box has a forward plate 43a attached to horizontal member 26 and to an angled frame unit member 48, two rearwardly projecting upper and lower plates 43b and 43c attached to 43a, and a rearward upright plate 43d attached to 43b and 43c. Plate 43d carries bolts 49 via which the tire hub 50 is attached to 43d, via nuts 51. See FIG. 3. The use of a box 43 provides additional impact protection, as it can collapse, forwardly, absorbing impact energy, in case of very severe impact loading.

FIG. 5 shows use of an optional collapsible forwardly extending, adjustable strut means 60 extending between the vehicle rear panel 14 and a frame plate 75 extending adjacent rear tire 41. The strut means 60 acts as a stabilizer to reduce vibration of the tire and frame unit (and latch to be described) and yet is collapsible in case of impact. See strut means forwardly extending hollow member 60a, welded to frame member 26; bolt 67 extending from 75 forwardly into member 60a; nut 68 threaded on bolt 67 and engagable against end plate 70 on 60a, the nut rotatable to adjust the compressive force exerted on the plate 75 and tire to stabilize the tire and the frame unit against vibration; rubber stop pad 71 engagable against the vehicle rear panel 14; slider 72 carrying pad 71 and slidable in the member 60a, and adjustable clamp screw 73 carried by the member 60a at its side and frictionally engagable at 74 against the slider. Screw 73 is rotated to prevent relative sliding of 72 in 60a, except in case of impact. Strut means or stabilizer 60 is located above the connections of the frame unit to the vehicle parts 28 and 28a, whereby three-point, stabilized support of the frame unit and heavy tire relative to the vehicle is achieved, the upper "point" being cushioned as at resiliently compressible stop pad 71.

Also provided is latch means associated with the left end portion of the frame unit (i.e. associated with member 23), and also associated with a second support part or strut 80 rigidly connected at 81 to the frame structure 28a. Part 80 below the left end of unit 20 corresponds to a part or strut 29 below the right end of the unit 20, and previously described. Part 80 carries an upright member 81 that registers in near side by side vertical relation with frame unit member 22 when the unit 20 is closed, i.e. in FIG. 3 position. At such time, the members 22 and 81 are latched together by latch means, with compressible rubber bumper pads 84 therebetween. See FIG. 2. Such pads may be carried by 81, as is clear from FIG. 4.

FIG. 6 shows a camming tapered guide pin 90 carried by member 22 entering a guide slot 91 in member 81. A latch or cam pin 92 carried by a handle 93 enters a keeper slot 94 when handle 93 is swung to FIG. 8 closed position. See handle carrier arm 193 pivotably connected at hinge 95 to fixed upright member 81, in FIGS. 6 and 8. Arrow 97 shows the direction of arm release swinging.

Finally, a lock arm 100 pivoted at 101 to member 22, is urged by spring 102 to lock to arm 193. See latching nose 100a of 100 fitting over the arm 94 in FIG. 7. Upon downward swinging of arm 100 in the direction of arrow 103, nose 100a lifts off 94 and allows handle 93 to be swung in the direction of arrow 97 in FIG. 8, to release the frame unit 20 from upright member 81, whereby the frame unit can swing, as in FIG. 4, giving access to the cam 40.

It will further be noted that the support structure including struts 29 for the frame unit, and their connections, locations and projections, including levels relative to the rear vehicle bumper, frame structure and unit 20, extend laterally such that the frame unit 20 can extend and swing free of interferences with the rear bumper.

I claim:

1. Heavy duty protective apparatus mounted at the rear of a vehicle having a vehicle frame and a rear bumper, comprising in combination:
    a) a protective frame unit extending laterally of the vehicle rear, and forming protected space between the frame unit and vehicle rear to receive equipment,
    b) support structure including hinge means attached to the vehicle frame and supporting said frame unit for swinging movement rearwardly away from and independently of the vehicle rear, said support structure including struts extending laterally relative to the vehicle frame and at levels such that said frame unit extends laterally and also swings free of interference with the vehicle rear bumper,
    c) and stabilizer means exerting compressive force between the vehicle rear and a tire support carried by the frame unit, said stabilizer means including force transmitting elements which are relatively collapsible in the event of impact against the tire.

2. The combination of claim 1 including liquid container means in said protected space.

3. The combination of claim 2 wherein said liquid container means includes two liquid containers carried by a mid-portion of said frame unit.

4. The combination of claim 1 including a vehicle tire carried by the frame unit rearwardly of said protected space.

5. The combination of claim 4 wherein said frame unit includes upright members spaced apart laterally widthwise of the vehicle rear, and vertically spaced generally laterally extending members each connected to said upright members, and said tire support defined by a support box attached to said frame unit, said support box rearwardly supporting said tire.

6. The combination of claim 4 including liquid container means carried by said frame unit forwardly of said vehicle tire, to be protected from impact by both the tire and the frame unit.

7. The combination of claim 6 wherein said liquid container means includes two liquid containers carried by a mid-portion of said frame unit.

8. The combination of claim 1 wherein said frame unit includes upright members spaced apart laterally widthwise of the vehicle rear, and vertically spaced generally laterally extending members each connected to said upright members.

9. The combination of claim 1 wherein said frame unit has end portions which are spaced apart laterally widthwise of the vehicle rear, and said support structures include a first support part rigidly connected with the vehicle frame at a first location, a second support part rigidly connected with the vehicle frame at a second location, said first and second locations spaced apart laterally widthwise of the vehicle rear, and said hinge means carried by one of said frame unit end portions and by said first support part and including latch means associated with the other of said frame unit end portions and said second support part.

10. The combination of claim 9 wherein said latch means includes interfitting latch elements, one element carried by said other of the frame unit end portion, and the other element rigidly carried by said second support part.

11. The combination of claim 10 wherein said one and said other latch elements are carried by vertically elongated members that register when the frame unit is moved to closed position, one member integral with the frame unit and the other member integral with the second support part, there being a handle connected to said one latch element to swing said one latch element toward and away from the other latch element.

12. The combination of claim 11 wherein said one latch element includes a cam pin, and the other latch element includes a keeper slot into which the cam pin is received when the latch elements interfit.

13. The combination of claim 12 including a spring hinged lock arm for releasably holding said latch elements in interfitting condition.

14. The combination of claim 1 wherein said support structure provides two point connection of the frame unit to the vehicle, and there being an adjustable means connected with the frame unit to provide a third point of connection to the vehicle, above the level of the frame, said adjustable means also providing for cushioned force transmission between the frame unit and the vehicle.

15. The combination of claim 1 including a tire support carried by the frame unit, the tire support including a box interposed between the tire and the frame unit, to absorb impact loading.

16. Heavy duty protective apparatus mounted at the rear of a vehicle having a vehicle frame and a rear bumper, comprising in combination:

a) a protective frame unit extending laterally of the vehicle rear, and forming protected space between the frame unit and vehicle rear to receive equipment, b) support structure including hinge means attached to the vehicle frame and supporting said frame unit for swinging movement rearwardly away from and independently of the vehicle rear, said support structure including struts extending laterally relative to the vehicle frame and at levels such that said frame unit extends laterally and also swings free of interference with the vehicle rear bumper, c) and stabilizer means exerting compressive force between the vehicle rear and a tire support carried by the frame unit, said stabilizer means including force transmitting elements which are relatively collapsible in the event of impact against the tire, d) stabilizer means extending in force transmitting relation between the frame unit and vehicle rear, above the vehicle frame, to exert force for resisting vibration of the frame unit relative to the vehicle rear, e) said stabilizer means also exerting cushioned force transmission to a tire support carried by the frame unit, to resist vibration of the tire and its support, as well as the hinged frame, f) and including said tire support in the form of a plate, said stabilizer means including an element positioned in force transmitting relation to the plate, a strut, and adjustable connection between said strut and said element, and a compressible elastomeric pad located between the strut and a vehicle rear panel.

17. The combination of claim 16 including a slider carrying said pad, the slider having frictional slide connection to the strut.

* * * * *